Oct. 13, 1970    R. LUKSO    3,534,327
INDICATOR SYSTEM
Filed June 5, 1967

INVENTOR.
RICHARD LUKSO
BY
*J. Schmidt*
ATTORNEY

United States Patent Office 3,534,327
Patented Oct. 13, 1970

3,534,327
INDICATOR SYSTEM
Richard Lukso, Grand Rapids, Mich., assignor to
Lear Siegler, Inc.
Filed June 5, 1967, Ser. No. 643,685
Int. Cl. G01c 19/00
U.S. Cl. 340—27                                    10 Claims

ABSTRACT OF THE DISCLOSURE

Apparatus for controlling the spacial position of a vehicle position display indicator such as a flight indicator on an aircraft in response to the actual spacial position of the vehicle. An AC signal is picked from the appropriate gyro-platform axis and compared with a signal indicative of the instantaneous spacial position of the flight indicator. From this comparison, an AC error signal is generated which is fed to a DC torquer mounted directly on the axis of rotation of the indicator via an isolation amplifier, a rectifying demodulator, a differentiating shaping network, a resistance-capacitance damping circuit and a power amplifier. The gyro gimbal position signal and the indicator position signal are compared by means of a control transformer which is mounted for rotation with the indicator and thus, which directly and inherently senses the indicator position.

BACKGROUND

This invention relates to indicator systems and, more particularly, to apparatus for driving an indicator in response to vehicle positional signals.

Present day aircraft have an indicator in the cockpit which indicates to the pilot the attitude of the aircraft. The indicator is controlled from a suitable gyro platform mounted within the aircraft which provides signals indicative of the attitude of the aircraft with respect to a predetermined reference point. These signals are compared with the output of a flight indicator position-sensing device and an error signal is developed which is utilized to reposition the flight indicator to a null position which displaying corresponds to the actual aircraft position.

In the past, the mechanical repositioning of the indicator in response to variations in the attitude of the aircraft has been effected by means of an AC servomotor coupled via a suitable gear-reduction system to the shaft about which the indicator rotates. As the AC servomotor is activated in response to an existing error signal, the indicator mechanism rotates about the shaft until a null is achieved.

The drawbacks of this type of position system have long been appreciated by those skilled in the art. The necessity of providing a gear train because of the relatively low torque obtainable from an AC servomotor substantially affects production costs and, additionally, contributes to the inaccuracy of the system because of the near physical impossibility of fabricating and maintaining the gear assembly, particularly the teeth, such that near-absolute accuracy of rotational thrust transmission is obtained. The fact that the AC servomotor must be constantly excited during operation of the aircraft, in addition to increasing the power consumption of the unit, results in the dissipation of relatively large quantities of heat within the mechanism which heat materially attributes to instrument deterioration. Finally, the inherent velocity lag and velocity saturation problems existing in the AC servo system limit the degree of accuracy obtainable.

OBJECTS AND SPECIFICATIONS

It is an object of this invention, therefore, to provide an indicator system not subject to the inherent disadvantages of prior art systems outlined above.

More particularly, it is an object of this invention to provide a system of the type described wherein the indicator is servoed to the actual aircraft attitude without utilizing a gear train or similar device and, thus, wherein the overall simplicity of the system is improved markedly.

It is an object of this invention to provide a system of the type described wherein fabrication costs, maintenance costs and, perhaps more importantly, on-the-job failures are markedly reduced.

It is yet another object of this invention to provide a system of the type described employing an indicator torquer requiring input power only when repositioning the indicator to correspond to the actual vehicle attitude and, thus, wherein input power and the attendant heat dissipation are markedly reduced.

It is an object of this invention, additionally, to provide a system of the type described which virtually eliminates velocity lag and velocity saturation problems which have plagued the prior art since its inception and, yet, which is capable of achieving a higher positioning accuracy than that previously obtainable.

Thus, it is an object of this invention to provide a system which is both reliable and accurate and, yet, which may be fabricated, installed and maintained economically.

These as well as other objects of this invention will be readily understood with reference to the following specification and accompanying drawings in which.

Briefly, this invention comprises a DC torquer directly mechanically coupled to the display indicator, the torquer being adapted to move the indicator in response to DC signals applied thereto. Means are provided for sensing the position of the display indicator relative to the position of the vehicle and generating a correction signal in response thereto. The correction signal so derived is transmitted to the DC torquer, after suitable processing, causing the indicator to rotate to a new null position which corresponds to the actual attitude of the vehicle.

Figure 1:
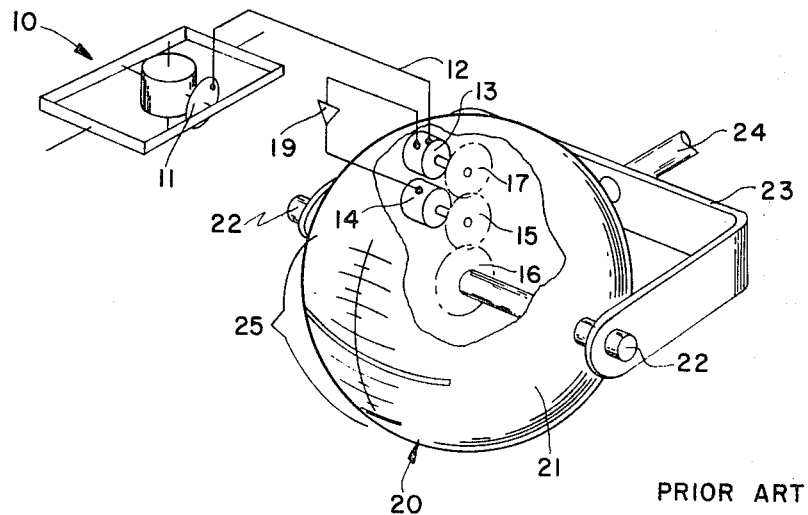
FIG. 1 is a fragmentary, perspective of a prior art attitude indicator system.

FIG. 1 has been included in the drawings merely as illustrative of the prior art solutions which have been proposed. A brief discussion of such systems, it is believed, will aid greatly in the understanding of the concepts of the instant invention to be discussed in detail hereinafter. Referring specifically to FIG. 1, a conventional gyro platform 10, having a pitch synchro transmitter 11 suitably mounted thereon, is positioned within the aircraft or other vehicle in conjunction with which the system is to operate in conventional fashion. While both the prior art illustration and the preferred embodiment of the instant invention are illustrated in conjunction with the pitch axis of the aircraft, it will be readily appreciated by those skilled in the art that the concepts to be described hereinafter are applicable equally to the other vehicle axes as well.

The prior art indicator assembly, indicated in FIG. 1 generally by the reference numeral 20, comprises a spherical-shaped indicator 21 fixedly mounted on an axis 22 for rotation within gimbal frame 23. The gimbal frame 23, ordinarily, is suspended from a shaft such as indicated at 24 which functions to provide a roll indication on the indicator which need not be discussed in detail. The face of the indicator sphere 21 is provided with suitable indicia which, in conjunction with a suitable reference line on the lense or crystal of the instrument and suitable movements of the sphere 21, indicate to the pilot the spacial position or attitude of the vehicle.

Referring still to the prior art illustration of FIG. 1, indicator 21 is mounted to be rotated by a servomotor 14 having a gear 15 in driving connection with a gear 16 on axis 22 and a gear 17 on a synchro receiver 13. The position signals transmitted from the gyroscope via pitch synchro transmitter 11 are fed via line 12 to synchro receiver 13.

Rotation of the AC servomotor 14 to move the indicator is obtained by sending a signal from the synchro receiver 13 through amplifier 19 to the servomotor 14. The signal so transmitted is derived from a comparison within synchro receiver 13 of the signal indicative of the actual aircraft position appearing on line 12 and a signal indicative of the actual indicator position generated inherently within the synchro receiver 13 via the position gear 17.

As pointed out previously in this application, the gear reduction system illustrated by the gears 15 and 16 is necessitated by the relatively low torque obtainable from the AC servomotor 14. The expense of fabrication and loss of accuracy introduced into the system by the gear train as well as other inherent disadvantages of the prior art system has been obviated by the present invention, a preferred embodiment of which will now be discussed in detail.

Figure 2:
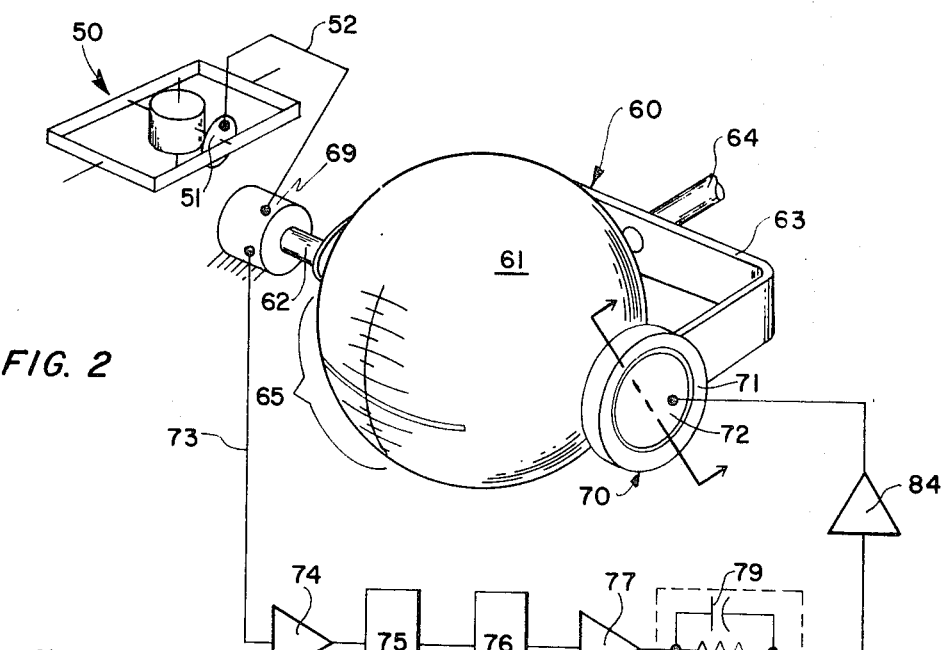
FIG. 2 is a schematic illustration of the attitude indicator system, partially in perspective, which is the subject of this invention.
Figure 3:
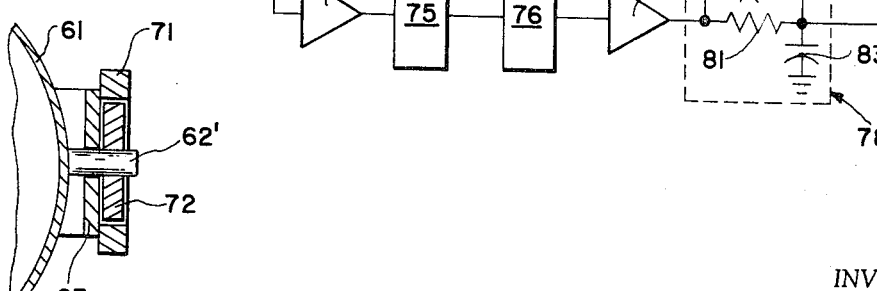
FIG. 3 is a fragmentary, cross-sectional view taken along plane III—III of FIG. 2.

Referring to FIGS 2 and 3, a gyro platform 50, which may be identical to that described in connection with FIG. 1, is mounted within the aircraft in conventional fashion. A pitch synchro transmitter 51 is suitably positioned on the platform and derives a signal indicative of the spacial position of the aircraft or other vehicle about one of the axes which in the preferred embodiment is the pitch axis although, as pointed out previously, the concepts of this invention are applicable equally to either the roll or azimuth axes.

The indicator assembly, indicated generally by the reference numeral 60, comprises a sphere-shaped indicator 61 having indicia 65 on the face thereof suitably borne within the gimbal frame 63 by means of oppositely disposed ear-like shafts 62 and 62'. Shafts 62 and 62' may comprise a continuous shaft running the center of the indicator 61 or alternatively as shown, may be separate pieces suitably affixed to the exterior surface of the indicating sphere 61 along a diameter thereof. The support gimbal 63, as was the case in FIG. 1, is provided with a roll support axis 64 to which a system identical to that to be discussed could be attached by providing a suitable roll signal from the gyro platform 50.

A conventional control transformer 69 is mounted to the extremity of shaft 62. The signal from the pitch synchro transmitter 51 is fed via line 52 to the control transformer 69 which generates, additionally, a signal indicative of the spacial position of the indicator sphere 61, simultaneously compares the two in accordance with a predetermined relative pattern and emits an error signal on line 73.

The DC torquer, indicated generally by the reference numeral 70, has its rotor mounted directly to the shaft 62' on the indicator sphere 61 and its stator 71 affixed to the gimbal frame 63. The torquer has a wound armature and a permanent magnet field which, acting together, convert electrical voltages directly into torque to maintain the desired accuracy of the system. Power is supplied to the torquer armature 72 only when the position of the indicator 61, as sensed by the control transformer 69, does not correspond to the actual position of the aircraft or other vehicle as indicated by pitch synchro transmitter 51. Since the entire system is null seeking, the torquer 70 requires a power input only when an acceleration is commanded by a change of attitude in the vehicle.

Because of design considerations which it is not deemed necessary to discuss in detail, the transducer system of an attitude indicator and, for that matter, most positions servo systems is referenced to an AC voltage supply. Thus, the error signal appearing on line 73 from control transformer 69 will ordinarily be alternating in nature. Since the signal is to be utilized eventually to null the indicator by means of a DC torquer, it must be converted or demodulated into direct current prior to directing it to the power stage of the system.

In order to accomplish the necessary conversion as well as otherwise render the error signal more suitable for its intended purpose, the AC error signal appearing on line 73 is fed initially to a conventional isolation amplifier 74. The isolation amplifier reduces greatly the synchro transmitter loading to prevent interference with the other aircraft systems which are utilizing the same gyro transmitter 51. The signal is then routed to a demodulator or converter, indicated in block form by the reference numeral 75, which performs two distinct functions in conventional fashion. Initially, the demodulator 75 converts the AC error signal to direct current in which form it can be utilized after further processing to drive the DC torquer 70. The demodulator 75, additionally, acts as a quadrature stripper, resulting in a lower servo loop null, lower power consumption, lower internal temperature rise, and thus, improved reliability.

The demodulated or converted signal is transmitted from demodulator 75 to the shaping network 76. The shaping network 76 differentiates the signal to provide a derived rate for servo damping. A derived rate of this type, rather than a tachometer or direct displacement rate, is desirable because it renders the servo lag much lower at high follow-up rates.

The derived or rate-of-change signal is transmitted from shaping network 76 to a conventional DC amplifier 77 which may or may not be necessary, depending upon the strength of the signal at that point. From the amplifier 77, the signal is fed to a damping circuit, indicated generally by the reference numeral 78, which damps the signal and, thus, lowers markedly the steady-state response time of the system. The damping network illustrated is basically a lead-lag type of network consisting of a parallel arrangement of a capacitor 79, a resistor 81 and a shunt capacitor 83 which, of course, will have a lower capacitance than capacitor 79. Since it is necessary to demodulate the AC error signal emitted from control transformer 69 so that it may be utilized to eventually drive the DC torquer, the damping network illustrated provides a relatively simple and inexpensive means whereby the signal may be damped in order to reduce the null time of the system to within reasonable limits.

The output from the damping circuit 78 is amplified by means of power amplifier 84 and then routed directly to the armature 72 of the DC torquer 70. The emitter signal, of course, causes the DC torquer to rotate the spherical indicator 61 in the proper direction about axis 62 until an error signal is no longer emitted on line 73 by means of power amplifier 84 and then routed directly position of the indicator sphere 61 corresponds in predetermined fashion to the spacial position or attitude of the vehicle.

Assume, by way of example, that the indicator system 60 and gyro platform 50 are mounted within an aircraft, the indicator assembly 60, of course, being visible to the pilot and suitably referenced in conventional fashion. When the craft maneuvers about the pitch axis, the pitch synchro transmitter 51 will change the level of the AC signal on line 52. The control transformer 69 will immediately sense the non-correspondence of the vehicle attitude about the pitch axis and the position of indicator sphere 61 and emit an AC signal on line 73 of proper polarity depending upon whether the aircraft is driving or climbing. The signal will be instantaneously converted to a DC signal in demodulator 75, differentiated within shaping network 76, damped within damping circuits 78, amplified within power amplifier 84 and applied to the armature 72 of the DC torquer. Application of the signal on the armature 72 will cause a torque to be exerted on shaft 62' and, thus, rotate the entire sphere 61 until such time as the error signal on line 73 and, thus, the torquing signal to armature 72 has dissipated. Steady-state condition requiring no power input to the torquer will continue thereafter until such time as the aircraft is maneuvered again into a dive or climb. When this occurs, the new aircraft attitude about the pitch axis will be transmitted almost immediately to the indicator sphere 61 so that the pilot or other operators may accurately ascertain the instantaneous attitude of the aircraft with respect to the pitch axis.

As pointed out, a similar DC torquer to that shown at 70 in FIG. 3 can be positioned in rotating relationship with respect to shaft 64 which would be suspended, of course, from a suitable gimbal frame. A separate control transformer would be provided on axis 64 and a signal transmitted thereto from a roll synchro transmitter on the gyro platform (not shown). Any resultant error signal would be processed in a circuit generally identical to that described in connection with the pitch axis indicator system and the signal thus processed fed to the roll-axis DC torquer until such time as a null had been obtained.

While a preferred embodiment of this invention has been illustrated in detail, it will be readily apparent to those skilled in the art that other embodiments may be conceived and fabricated without departing from the spirit of this specification and the accompanying figures. Such other embodiments are to be deemed as included within the scope of the following claims unless these claims, by their language, expressly stated otherwise.

What is claimed is:

1. In an indicator system for a vehicle having a moveable indicator member and means for sensing the position of the vehicle relative to the position of the indictaor member and generating an error signal in response thereto, the improvement comprising:
   a DC torquer mechanically coupled to said indicator member, said torquer being adapted to move said member in response to a signal applied thereto; and
   means for transmitting said error signal to said torquer whereby said member will be moved to cause its indication to correspond to the the position of said vehicle.

2. The system as set forth in claim 1 wherein said error signal is an alternating current signal and which further comprises means for converting said AC signal to a DC signal during its transmission to said torquer.

3. The system as set forth in claim 2 which further comprises shaping network means for differentiating said DC signal during its transmission to said torquer.

4. The system as set forth in claim 2 which further comprises means for damping the differentiated signal emitted from said differentiating means.

5. The system as set forth in claim 4 wherein said damping means comprises R-C damping network.

6. The system as set forth in claim 5 wherein said indicator member revolves and wherein said relative position sensing means comprises a rotatable control transformer mounted coxially with the axis of rotation of said indicator member.

7. The system as set forth in claim 1 wherein said indicator member revolves and wherein said relative position sensing means and said comparing means comprises a rotatable control transformer mounted coaxially with the axis of rotation of said indicator member.

8. Apparatus for controlling the position of a vehicle position display indicator in response to the actual vehicle position comprising:
   a DC torquer directly mechanically coupled to said display indicator, said torquer being adapted to move said indicator in response to signals applied thereto;
   means for sensing the position of said display indicator relative to the position of said vehicle and generating a DC correction signal in response thereto; and
   means for transmitting said correction signal to said torquer.

9. The apparatus as set forth in claim 8 which further comprises an R-C damping network disposed in circuit between said sensing means and said torquer.

10. In an indicator system for a vehicle having means for sensing the position of the vehicle and generating a vehicle position signal in response thereto; an indicator member; means for sensing the position of said indicator member and generating an indicator position signal in response thereto; and means for comparing said vehicle and indicator position signal and generating an error signal in response thereto; the improvement comprising:
   a DC torque mechanically coupled to said indicator member; and
   means for transmitting said error signal to said torquer whereby said member will be moved to cause its indicator to correspond to the position of said vehicle.

References Cited

UNITED STATES PATENTS

| | | | |
|---|---|---|---|
| 2,293,502 | 8/1942 | Hermann | 340—187 |
| 3,286,143 | 11/1966 | Kurtz et al. | 318—20.645 |

ALVIN H. WARING, Primary Examiner

H. S. COHEN, Assistant Examiner

U.S. Cl. X.R.

318—20.645; 340—187